(12) United States Patent
Grussmann

(10) Patent No.: US 10,094,243 B2
(45) Date of Patent: Oct. 9, 2018

(54) TURBINE HOUSING FOR AN EXHAUST TURBOCHARGER

(71) Applicant: BENTELER Automobiltechnik GmbH, Paderborn (DE)

(72) Inventor: Elmar Grussmann, Altenbeken-Buke (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 280 days.

(21) Appl. No.: 14/994,377

(22) Filed: Jan. 13, 2016

(65) Prior Publication Data
US 2016/0201513 A1    Jul. 14, 2016

(30) Foreign Application Priority Data
Jan. 14, 2015   (DE) .......................... 10 2015 100 517

(51) Int. Cl.
| F01D 25/26 | (2006.01) |
| F01D 25/24 | (2006.01) |
| F02B 37/00 | (2006.01) |

(52) U.S. Cl.
CPC .......... *F01D 25/243* (2013.01); *F01D 25/26* (2013.01); *F02B 37/00* (2013.01); *F05D 2220/40* (2013.01); *F05D 2230/60* (2013.01)

(58) Field of Classification Search
None
See application file for complete search history.

(56) References Cited

U.S. PATENT DOCUMENTS

| 2010/0074744 A1* | 3/2010 | Phillips, Jr. ............. F01D 9/026 415/208.1 |
| 2010/0098533 A1* | 4/2010 | Grussmann ............... F01D 9/02 415/203 |
| 2010/0316494 A1* | 12/2010 | Gru mann ............... F01D 25/26 415/231 |
| 2011/0236191 A1* | 9/2011 | Grussmann ........... F01D 25/243 415/177 |
| 2011/0286837 A1* | 11/2011 | Smatloch .............. F01D 25/243 415/170.1 |
| 2012/0023928 A1* | 2/2012 | Smatloch ................ F01D 9/026 60/598 |
| 2012/0102737 A1* | 5/2012 | Smatloch ................ B23P 15/00 29/888.02 |

(Continued)

FOREIGN PATENT DOCUMENTS

| DE | 29909018 | 9/2000 |
| DE | 10022052 | 3/2001 |
| DE | 102009025054 | 12/2010 |

(Continued)

*Primary Examiner* — Woody Lee, Jr.
*Assistant Examiner* — Theodore Ribadeneyra
(74) *Attorney, Agent, or Firm* — Jacobson Holman, PLLC

(57) ABSTRACT

A turbine housing for a turbocharger is provided. The turbine housing includes an exterior housing and an interior housing as well as a bearing flange. The exterior housing is connected to the bearing flange. The interior housing includes a flange socket on which the bearing flange is positioned. A fastening ring is inserted inside in the bearing flange and connected to the flange socket, with the bearing flange being fixed in the axial direction (AR) by the fastening ring.

7 Claims, 2 Drawing Sheets

(56) References Cited

U.S. PATENT DOCUMENTS

Figure 1:
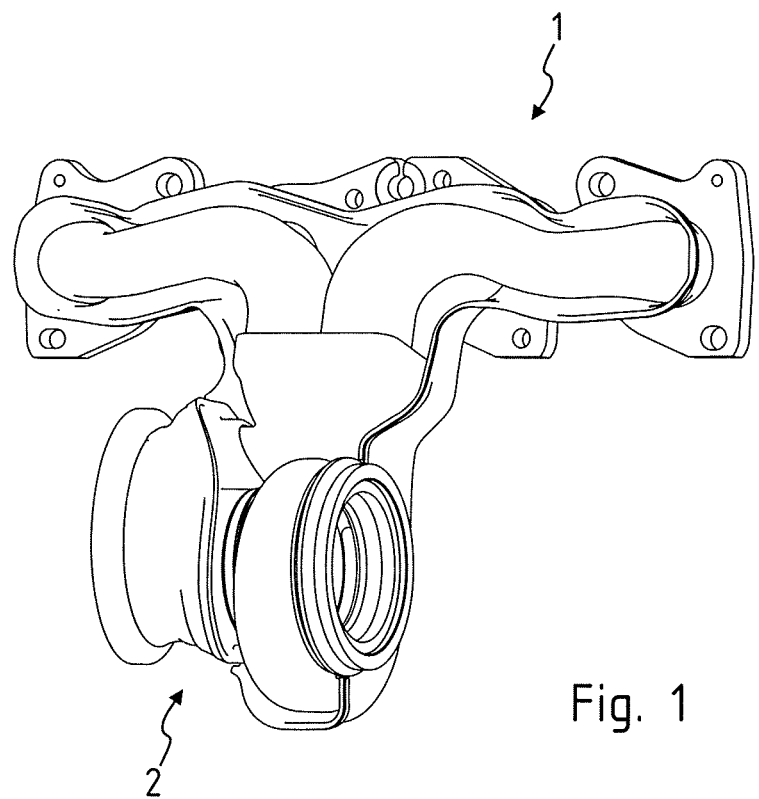

2012/0294709 A1* 11/2012 Grussmann ........... F01D 25/243
                                                       415/200
2013/0064656 A1*  3/2013 Smatloch ................ F01D 9/026
                                                     415/182.1

FOREIGN PATENT DOCUMENTS

| | | |
|---|---|---|
| DE | 102009042260 | 4/2011 |
| DE | 102010021114 | 11/2011 |
| DE | 102010022218 | 11/2011 |
| DE | 102011050506 | 11/2012 |
| EP | 2388455 | 11/2011 |
| EP | 2525050 | 11/2012 |
| FR | 2795769 | 1/2001 |
| JP | 2002054447 | 2/2002 |

\* cited by examiner

TURBINE HOUSING FOR AN EXHAUST TURBOCHARGER

The invention relates to a turbine housing for an exhaust turbocharger according to the features in the preamble of claim 1.

Exhaust turbochargers increase the air flow of a motor by compressing the air required for combustion.

With the use of turbochargers, compared to aspirated engines of identical displacement, the output, torque, and also the efficiency can be increased. The turbocharger comprises a turbine and a compressor, which are mounted on a common shaft and statically connected to each other. The turbine or the turbine wheel is driven by the flow of hot exhaust gases. The rotor of the compressor also spins due to the static connection and compresses the inflowing fresh air. The temperature of the compressed air is cooled by a charge-air cooler, in order to reduce the volume and this way allow guiding more air or oxygen into the combustion chamber. With the use of turbochargers not only improved output is yielded, but primarily also an energy saving effect and lower emissions.

A turbine housing for a turbocharger according to DE 100 22 052 C2 is considered prior art. Here, the decoupling of the exhaust conducting parts from supporting or sealing exterior structures is suggested. The rotor housing or the interior housing is composed of two half-shells and surrounded by an exterior housing, with an air gap forming between the two housings. This air gap acts as a thermal insulator and thus reduces the heat emission. A bearing flange is welded to the rotor housing and the exterior housing.

In the turbine housing known from DE 10 2009 25 054 A1 an interior housing is also located inside an exterior housing. The interior housing is formed by two sheet-metal shells, welded to each other at the exterior circumference. The exterior housing is therefore welded to a bearing flange as well as an outlet flange.

A similar design of the turbine housing is shown in DE 10 2010 021 114 A1. Both the exterior housing and the interior housing are composed of two half-shells. The exterior housing is connected to a bearing flange by material engagement. The interior housing is coupled in a form-fitting way to a bearing flange.

In the turbine housing known from DE 10 2009 042 260 A1 the bearing flange is welded to the exterior housing. The bearing flange may also be formed as a separate component or in one piece together with the interior housing or the rotor housing.

As already explained at the outset, a turbocharger is driven by the motor exhaust. This is guided at high speeds and high temperatures of sometimes exceeding 1,000° C. to the turbine blades or turbine wheel. Accordingly, during operation the turbocharger is subjected to high mechanical and particularly the highest thermal stress. Due to the high thermal stress the interior housing is frequently embodied in one piece from cast material. The exterior housing generally comprises deformed sheet metal shells. They are usually welded via a welding seam to the bearing flange, which serves for fastening the turbocharger to a bearing housing of a turbine wheel. By the exhaust directly impinging the interior shell of the turbine housing said interior shell expands to a greater extent than the exterior shell. This different heating behavior leads to bending moments being introduced into the connection site of the bearing flange to the exterior shell, which can considerably reduce the stability of the part.

Based on prior art the objective of the invention is therefore to improve the thermal endurance of the turbine housing, particularly in the joint region between the bearing flange and the exterior shell.

This objective is attained in a turbine housing showing the features of claim 1.

Advantageous embodiments and further developments of the turbine housing according to the invention are characterized in that the retainer (8) shows an annular section (11) aligned towards the flange socket (7) with a frontal facial area (12) and the flange socket (7) shows a facial area (13), with the annular section (11) and the flange socket (7) contacting each other at facial areas (12; 13) and are joined; the facial area (13) of the flange socket (7) and the facial area (12) of the annular section (11) are embodied diagonally and complementary to each other; the bearing flange (5) comprises a radially circumferential groove (16) at its interior circumference (15), adjacent to the joined area between the flange socket (7) and the retainer (8); the retainer (8) comprises at its exterior circumference (17) at least sectionally a profiling (18); the flange socket (7) is embodied as a component in one piece with the interior housing (4) and made from the same material; the bearing flange (5) abuts with a contact section (24) the outside of the flange socket (7) as well as the outside of the interior housing (4); and the bearing flange (5) abuts with a contact section (24) the outside of the flange socket (7) as well as the outside of the interior housing (4).

The turbine housing of a turbocharger comprises an exterior housing and an interior housing as well as a bearing flange. The exterior housing is joined to the bearing flange. According to the invention the interior housing comprises a flange socket, on which the bearing flange is positioned. Furthermore, a fastening ring is provided which is joined to the flange socket. The bearing flange is fixed by the fastening ring in the axial direction.

The embodiment according to the invention leads to a decoupling of the interior housing from the bearing flange, whereby the thermal yielding endurance is increased. The interior housing presently produced, commonly by casting in one piece with the bearing flange, is divided into several separate parts in the area of the sectioning point. The interior housing shows a bearing socket. The bearing flange is positioned thereon. Subsequently the fastening ring is inserted in the bearing flange and connected to the flange socket of the interior housing by material engagement. Commonly this occurs by way of welding or soldering. The fastening ring is designed such, that it encompasses the bearing flange. This way, a form-fitting clamping of the bearing flange results. This step leads to a limited range of motion of the interior housing, which considerably reduces the bending moments and/or bending stress developing during operation.

The turbine housing according to the invention shows considerably higher component strength. The turbine housing designed according to the invention can also be used in further increasing motor power, particularly also at higher operating temperatures.

The fastening ring shows a radially circumferential collar section, which abuts an interior shoulder section of the bearing flange. This improves the form-fitting positioning of the bearing flange through this fastening ring. With the collar section the fastening ring engages the interior shoulder section of the bearing flange, ensuring the mobility of the interior housing provided according to the invention.

Beneficially, the fastening ring shows an annular section facing the flange socket with a frontal face area. The flange socket shows a facial area, with the annular section and the flange section contacting and being joined to each other with their facial areas.

The facial area of the flange socket and the facial area of the annular section are embodied slanting in a manner complementing each other. This is advantageous both with regards to the technical assembly as well as for the joining thereof.

Another advantageous embodiment provides that the bearing flange shows at its interior circumference a radially circumferential groove adjacent to the area of the connection between the flange socket and the fastening ring. The groove serves to separate the parts and represents a clearance which avoids that during the joining process of the flange socket and the fastening ring any material engagement develops with the bearing flange.

Furthermore it is advantageous for the fastening ring to show at least sectionally a profiling at its exterior circumference. The profiling increases the friction-fitting and/or force-fitting connection at the contact area between the fastening ring and the bearing flange. Preferably, the profiling is formed by knurling or grooving corrugation. By the profiling, particularly a knurling parallel to the axis of the fastening ring, the rotational positioning of the interior housing can be achieved in reference to the bearing flange. The profiling contributes to the torque-proofing between the bearing flange and the interior housing.

In particular, the flange socket is integral with, and made of the same material as, the interior housing. The flange socket transfers into the radial wall section of the interior housing. Here, the thick-walled portion of the flange socket reduces towards the radially aligned wall section of the interior housing.

The exterior housing is joined to the bearing flange. For this purpose, an exterior, circumferential brace is provided at the bearing flange, by which the exterior housing is joined to the bearing flange. A groove is formed directly adjacent to the brace, engaged by the exterior housing. The exterior housing itself is formed from sheet-metal shells made from steel. Beneficially the exterior housing comprises an upper shell and a lower shell, oppositely in reference to each other engaging the groove. The joint between the exterior housing and the bearing flange has previously been subject to high bending moments due to temperature changes. This consequently represents a highly stressed joint. This highly stressed joint is decoupled by the embodiment according to the invention.

Advantageously the bearing flange shows a contact area, by which the bearing flange contacts both the outside of the flange socket and the outside of the inner shell. This aspect advantageously supports the cooperation between the bearing flange, the interior housing, the exterior housing, and the fastening ring.

As already mentioned, the interior housing and the fastening ring are connected to each other after the positioning of the bearing flange. By this way the fastening ring and the interior housing are joined to each other in the area of the flange socket. The fastening ring and the flange socket of the interior housing are abutting at a lateral level, aligned perpendicular in reference to the longitudinal axis of the turbine housing, and connected to each other via a circumferential seam extending at the interior circumference. The two components are connected by a material engagement, particularly laser welding or soldering process, after a prior mechanic processing of the separation area. When selecting the material for the interior housing and the fastening ring, primarily material combinations that are austenitic/austenitic or ferritic/ferritic shall be selected. This way any thermal and/or mechanic stress in the area of the joint can be counteracted, which may be caused by different expansion coefficients.

Preferably the interior housing, the bearing flange, and the fastening ring are made from heat-resistant cast steel, particularly stainless, heat-resistant austenitic chrome-nickel steel. Cast steel is particularly used for the interior housing. The fastening ring and the bearing flange may either be cast, forged, or also sintered.

Within the scope of the invention it is also possible that the interior housing, the bearing flange, and the fastening are made from different cast steel materials. Here, for example the interior housing may comprise a cast steel material of a first type. The same applies to the bearing flange, while the retainer is made from a heat-resistant cast steel of a second type.

Figure 2:
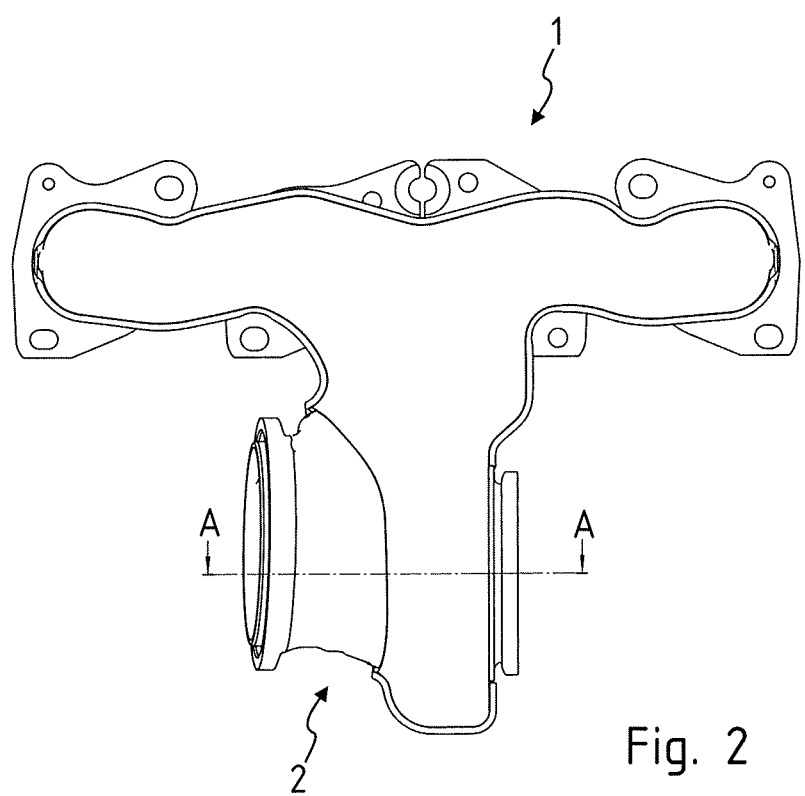
Figure 3:
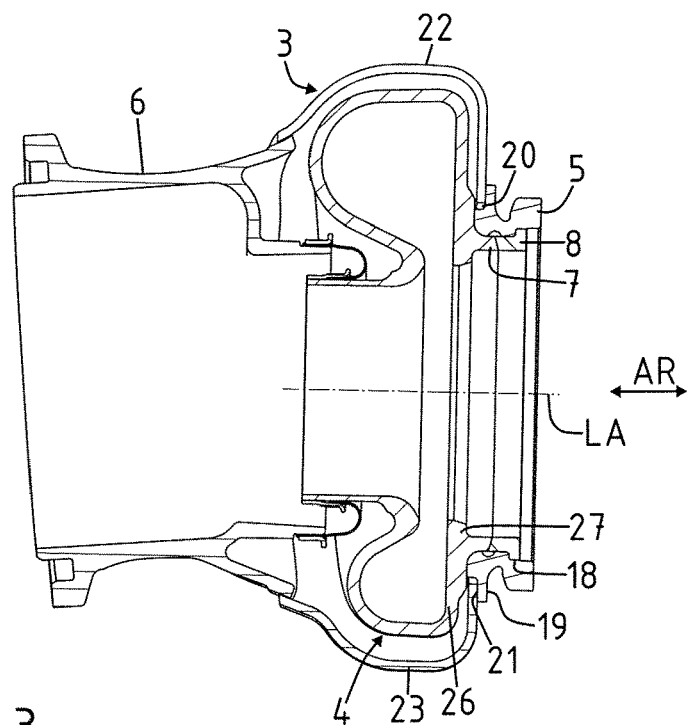
Figure 4:
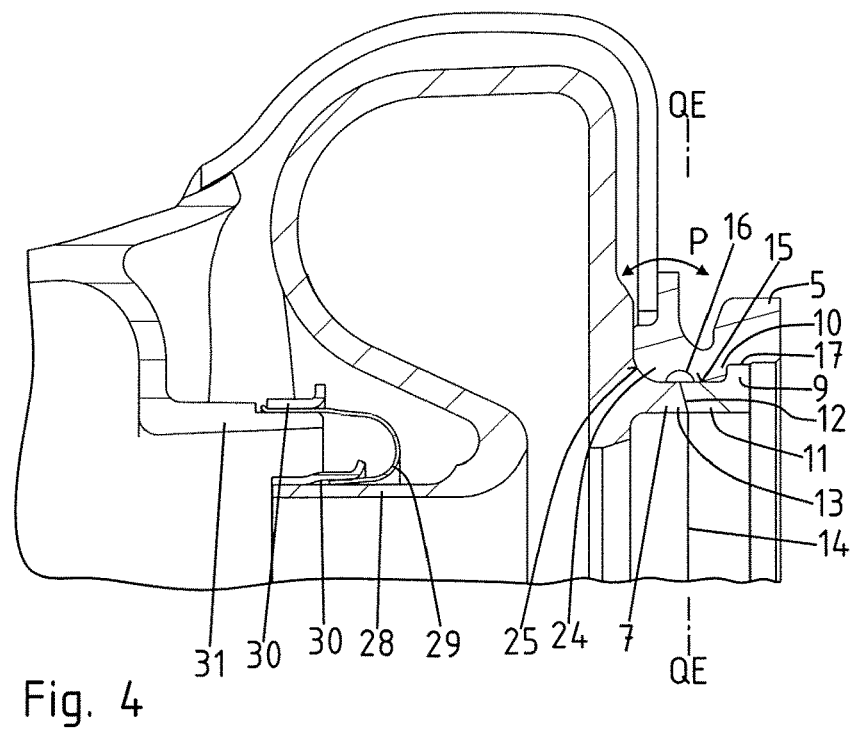

In the following, the invention is described in greater detail based on an exemplary embodiment shown in the drawings. It shows:

FIG. 1 in a perspective view an exhaust manifold of an internal combustion engine with a connected turbine housing of a turbocharger arranged downstream thereof;

FIG. 2 the illustration of the exhaust manifold according to FIG. 1 in a top view;

FIG. 3 a cross-section through the turbine housing along the line A-A of FIG. 2, and FIG. 4 an enlarged detail of the illustration of the turbine housing of FIG. 3.

FIGS. 1 and 2 show an exhaust manifold 1 of an internal combustion engine with a turbine housing 2 of a turbocharger arranged downstream thereof.

The turbine housing 2 is explained in greater detail based on FIGS. 3 and 4.

The turbine housing 2 comprises an exterior housing 3 and an interior housing 4. Further, a bearing flange 5 and an outlet flange 6 are provided.

The interior housing 4 includes a heat-resistant cast steel material. The interior housing 4 comprises a flange socket 7 at the side facing the bearing flange 5, made in one piece therewith and from the same material. A bearing flange 5 is positioned on the flange socket 7 and fixed in the axial direction AR by an interior fastening ring 8. The bearing flange 5 and the fastening ring 8 are also made from a heat-resistant cast steel material. The fastening ring 8 is inserted at the inside in the bearing flange 5 and connected to the flange socket 7 by a material connection process, particularly a welding or soldering process.

The fastening ring 8 clamps the bearing flange 5 in a form-fitting fashion to the interior housing 4. The fastening ring 8 shows a radially extending collar section 9 which contacts an interior shoulder section 10 of the bearing flange 5. An annular section 11, facing the flange socket 7, abuts at the shoulder section 10 of the fastening ring 8. The annular section 11 shows a frontal facial area 12. The flange socket 7 shows an exterior facial area 13. The facial area 12 of the annular section 11 and the facial area 13 of the flange socket 7 are embodied diagonally and complementary slanting to each other. The annular fastening ring 8 and the flange socket 7 are made to contact at a lateral plane QE aligned perpendicular in reference to the longitudinal axis LA of the turbine housing 2. Here, the facial areas 13 of the flange socket 7 and the facial area 12 of the annular section 11 contact each other. The fastening ring 8 and the flange socket 7 are joined to each other via a seam 14 circumferential at the interior circumference.

The bearing flange 5 shows at its interior circumference 15 a radially circumferential groove 16 adjacent to the area of the connection between the flange socket 7 and the fastening ring 8. The groove 16 serves for separating the components in order to avoid during the joining process between the flange socket 7 and the retainer 8 any material engagement with the bearing flange 5.

At its exterior circumference 17 the fastening ring 8 shows a profiling 18. The profiling 18 is particularly embodied as an axially parallel knurling. The profiling 18 assumes the rotational positioning of the interior housing 4 and the bearing flange 5 in reference to each other and acts as a torque-proofing means. In particular, the profiling 18 is provided at the exterior circumference 17 of the collar section 9 of the fastening ring 8.

At the exterior, the bearing flange 5 shows a circumferential brace 19. A groove 20 is embodied adjacent to the brace 19. The exterior housing 3 is connected via the brace 19 to the bearing flange 5 by means of a material engagement 21 particularly by welded or soldered connection. The exterior housing 3 is made of sheet steel and is assembled from an upper shell 22 and a lower shell 23, which positioned opposite each other engage the groove 20 and are connected to the brace 19.

The connection area between the exterior housing 3 and the bearing flange 5 is considered one of the highest stressed zones of the turbine housing 2. Here, high bending moments develop based on temperature changes. The bending moments caused by temperature changes in the highly stressed connection area are indicated by the arrow P in FIG. 4. By decoupling the interior housing 4 from the bearing flange 5 and the axial fastening of the bearing flange 5 via the fastening ring 8, a limited mobility of the interior housing 4 is possible. This way, the high bending stress developing by the bending moments occurring during operation can be reduced, particularly in the highly stressed connection area between the bearing flange 5 and the exterior housing 3.

The bearing flange 5 further comprises an abutting section 24. With the abutting section 24 the bearing flange 5 abuts at the outside of the flange socket 7 as well as the outside of the interior housing 4. The abutting section 24 shows a curved extending exterior contour 25, which is adjusted to the curved contour at the transition from the flange socket 7 to the radially aligned wall section 26 of the interior housing 4. The wall thickness of the interior housing 4 is embodied thicker in the area of the transition from the flange socket 7 to the radial wall section 26 than the wall thickness of the abutting spiral section of the interior housing 4.

An interior collar 27 of the interior housing 4 forms a stop for the bearing components received in the flange socket 7 and at the retainer 8.

It is further discernible that the exterior housing 3 is connected to the outlet flange 6. The interior housing 4 shows an outlet socket 28, which via a glide sleeve 29 and clamping parts 30 are connected to the receiving socket 31, which is an integral, one-piece component of the outlet flange 6 and made from the same material.

LIST OF REFERENCE CHARACTERS

1—Exhaust manifold
2—Turbine housing
3—Exterior housing
4—Interior housing
5—Bearing flange
6—Outlet flange
7—Flange socket
8—Fastening ring
9—Collar section
10—Shoulder section
11—Annular section
12—Facial area of 11
13—Facial area of 7
14—Seam
15—Interior circumference
16—Groove
17—Exterior circumference
18—Profiling
19—Brace
20—Groove
21—Joint
22—Upper shell
23—Lower shell
24—Abutting section
25—Exterior contour
26—Wall section
27—Interior collar
28—Outlet socket
29—Gliding sleeve
30—Clamping components
31—Receiving socket
QE—Lateral plane
LA—Longitudinal axis of 2
AR—Axial direction
P—Arrow

The invention claimed is:

1. A turbine housing for a turbocharger, which comprises an exterior housing and an interior housing as well as a bearing flange, with the exterior housing being joined to the bearing flange, characterized in that the interior housing shows a flange socket on which the bearing flange is positioned and a fastening ring is provided, which is joined to the flange socket and the bearing flange is fixed by the fastening ring in the axial direction (AR), characterized in that the retainer fastening ring shows an annular section aligned towards the flange socket with a frontal facial area and the flange socket shows a facial area, with the annular section and the flange sock contacting each other at the facial areas and are joined, and characterized in that the facial area of the flange socket and the facial area of the annular section are embodied diagonally, and complementary slanting to each other.

2. A turbine housing according to claim 1, characterized in that the fastening ring comprises a radially circumferential collar section, which abuts an interior shoulder section of the bearing flange.

3. A turbine housing according to claim 1, characterized in that the bearing flange comprises a radially circumferential groove at its interior circumference, adjacent to the area of the joined between the flange socket and the fastening ring.

4. A turbine housing according to claim 1, characterized in that the fastening ring comprises at its exterior circumference at least sectionally a profiling.

5. A turbine housing according to claim 1, characterized in that the flange socket is embodied as a component in one piece with the interior housing and made from the same material.

6. A turbine housing according to claim 1, characterized in that the bearing flange shows a brace extending circumferentially at the outside, by which the exterior housing is joined to the bearing flange.

7. A turbine housing according to claim 1, characterized in that the bearing flange abuts with a contact section of the outside of the flange socket as well as the outside of the interior housing.

\* \* \* \* \*